United States Patent [19]

Stencel, deceased et al.

[11] Patent Number: 5,080,305

[45] Date of Patent: Jan. 14, 1992

[54] LOW-ALTITUDE RETRO-ROCKET LOAD LANDING SYSTEM WITH WIND DRIFT COUNTERACTION

[76] Inventors: Fred B. Stencel, deceased, late of Clearwater, Fla.; by Michelle Stencel, representative, 1270 Gulf Blvd., #1406, Clearwater, Fla. 34302

[21] Appl. No.: 509,097

[22] Filed: Apr. 16, 1990

[51] Int. Cl.⁵ .................... B64D 1/02; B64D 17/34
[52] U.S. Cl. .................... 244/152; 244/138 R; 102/384
[58] Field of Search ........... 244/138, 152; 102/384, 102/387

[56] References Cited

U.S. PATENT DOCUMENTS

| | | | |
|---|---|---|---|
| H776 | 5/1990 | Cole | 102/387 |
| 2,560,445 | 7/1951 | Jackson | 244/138 |
| 2,693,327 | 11/1954 | Hild, Jr. | 244/138 |
| 2,872,138 | 2/1959 | Vogt | 244/138 |
| 3,116,901 | 1/1964 | Stencel | 244/138 |
| 4,409,658 | 10/1983 | Beusse | 364/424 |
| 4,440,366 | 4/1984 | Keeler et al. | 244/152 |
| 4,568,040 | 2/1986 | Metz | 102/384 |
| 4,624,424 | 11/1986 | Pinson | 102/384 |
| 4,711,178 | 12/1987 | Argyrakis | 102/384 |

FOREIGN PATENT DOCUMENTS

| | | | |
|---|---|---|---|
| 2163837 | 3/1986 | United Kingdom | 102/384 |
| 2167536 | 5/1986 | United Kingdom | 102/384 |

Primary Examiner—Joseph F. Peters, Jr.
Assistant Examiner—Virna Lissi Mojica
Attorney, Agent, or Firm—Roylance, Abrams, Berdo & Goodman

[57] ABSTRACT

A low-altitude, retro-rocket, load landing apparatus for decelerating the rate of descent of a load and counteracting sideward wind drift. The apparatus includes a support assembly having a tilting mechanism for adjustably coupling a rigid support member to the load for pivotal movement about a horizontal axis offset from the center of gravity of the load, a retro-rocket rigidly coupled to the support member, a plurality of sensors for determining wind direction, wind speed and altitude of the load, and a control assembly coupled to the sensors, rocket and tilting mechanism for actuating the tilting mechanism in response to output signals from the sensors. Actuation of the tilting mechanism varies the rocket's thrust direction and counteracts sideward wind drift.

24 Claims, 5 Drawing Sheets

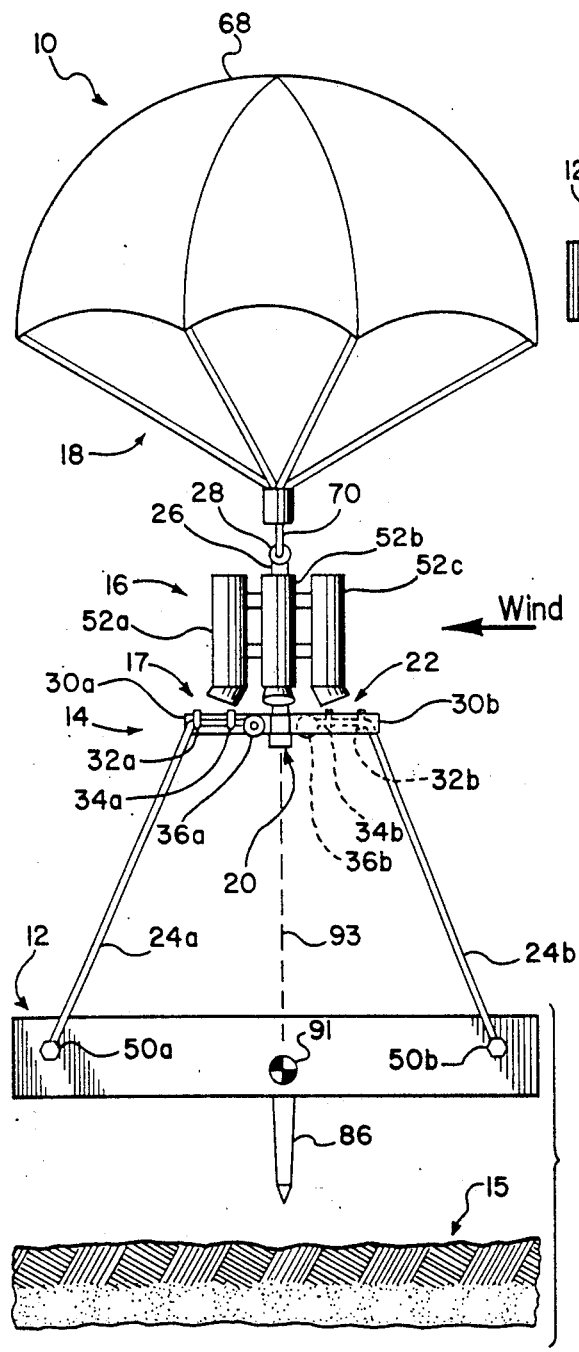
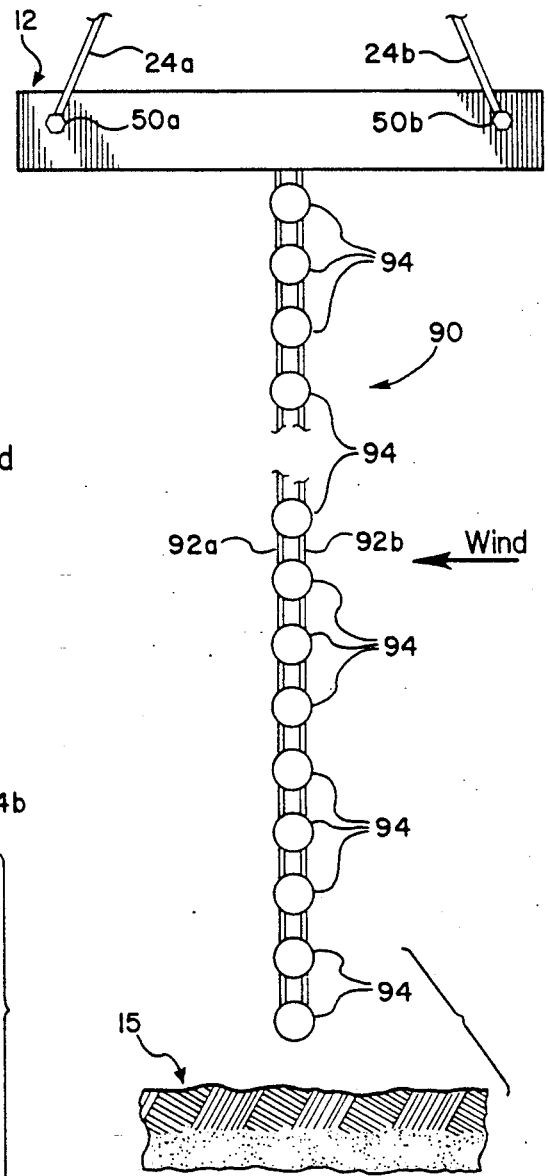
Fig. 1
Fig. 8

LOW-ALTITUDE RETRO-ROCKET LOAD LANDING SYSTEM WITH WIND DRIFT COUNTERACTION

FIELD OF THE INVENTION

This invention relates to a load landing apparatus capable of counteracting or cancelling the horizontal or sideward velocity of the load after it has been dropped from an aircraft flying at a low altitude. More specifically, the invention relates to a load landing apparatus having a rigid support member with at least one retro-rocket coupled thereto and a tilting mechanism for adjustably coupling the support member and rocket to the load for pivotable movement about a horizontal axis. The tilting mechanism is activated in response to signals indicating wind speed and direction, thereby varying the rocket's thrust direction and counteracting sideward velocity.

BACKGROUND OF THE INVENTION

In the past, loads weighing up to 35,000 pounds have been dropped from aircrafts at altitudes below 500 feet utilizing the combination of parachutes and retro-rockets to reduce the impact velocity of the load. Parachutes are the most efficient method for decelerating a mass or load to a velocity of about 70 feet per second, while below 70 feet per second the retro-rocket is the most efficient method to decelerate a mass or load to a near zero vertical velocity at ground impact. These parachutes and retro-rocket systems have been very successful in reducing the vertical velocity of a descending load to near zero at a distance just above the ground. On the other hand, most of these parachute and retro-rocket systems do not have any mechanism for counteracting the horizontal velocity of the load due to wind drift or the aircraft's horizontal movement. Accordingly, the load will typically hit the ground with a horizontal velocity and subsequently topple over.

Examples of these parachute and retro-rocket systems are disclosed in U.S. Pat. Nos. 2,560,445 to Jackson and 2,872,138 to Vogt.

Various load landing systems are known in the prior art which utilize pivotable retro-rockets. However, these load landing devices have several disadvantages.

For example, U.S. Pat. No. 3,116,901 to Stencel discloses a load landing device having four retro-rockets that are rotatable about a vertical axis for developing a net horizontal component of the thrust that will oppose the horizontal component of the relevant movement between the load and the landing surface. A disadvantage of the prior art Stencel apparatus is that the amount of pivotable adjustment of the retro-rockets depends on how its touchdown probe contacts the ground. Furthermore, the Stencel apparatus does not vary the amount of thrust depending upon the wind velocity. Accordingly, the Stencel device may under or over-compensate on the horizontal component causing the load to tumble upon contacting the ground.

Another example of a load landing apparatus is disclosed in U.S. Pat. No. 4,409,658 to Beusse which describes a vehicle which utilizes pivotable retro-rockets connected directly to the load. A disadvantage of the Beusse system is that the retro-rockets are mounted directly on the load and on landing can cause the grass or underbrush on the ground to ignite. Another disadvantage of the Beusse system is that the retro-rockets must be constantly reoriented to counteract both the horizontal and vertical velocity.

This invention addresses these problems in the art, along with other needs which will become apparent to those skilled in the art once given this disclosure.

SUMMARY OF THE INVENTION

Accordingly, a primary object of the invention is to provide a load landing apparatus for counteracting wind drift in low-altitude retro-rocket systems.

Another object of the invention is to provide a load landing apparatus that is relatively inexpensive to manufacture.

Another object of the invention is to provide a load landing apparatus to provide both horizontal velocity cancellation and an appropriate moment to raise the leading edge of the load to prevent the load from digging in and subsequently tumbling.

Another object of the present invention is to provide a load landing apparatus which is released and propelled from the load to allow immediate access to the load and reduced tendency to ignite underbrush.

The foregoing objects are basically attained by providing a load landing apparatus for decelerating the descent of a load and counteracting wind drift, the combination comprising: a powering device for generating a thrust; a support mechanism coupled to the powering device and to the load, and including a rigid support member, a mechanism for rigidly coupling the power device to the support member, and a tilting mechanism for adjustable coupling the support member to the load for pivotable movement about a horizontal axis offset from the center of gravity of the load; a first sensing device coupled to the support mechanism for determining the direction and speed of the wind relative to the load; a second sensing device coupled to the support mechanism for determining the altitude of the load; and a control mechanism coupled to the first and second sensing devices and to the tilting mechanism for actuating the tilting mechanism in response to output from the first and second sensing devices.

The foregoing objects are also basically attained by providing a load landing apparatus for decelerating the descent of a load and counteracting wind drift, the combination comprising: a support having first and second ends; a power device rigidly coupled to the support for decelerating the rate of descent of the load and counteracting wind drift; a first sensor, coupled to the support, for determining wind speed and wind direction relative to the load; a second sensor, coupled to said support, for determining the altitude of the load; a bridle mechanism coupled to the second end of the support and to the load for suspending the load from the support during descent of the load, the bridle mechanism including a plurality of bridle members, each of the bridle members having a first predetermined length extending between the support and the load, and a tilting mechanism for adjusting the first predetermined length of at least one of the bridle members to a second predetermined length, and thereby tilting the support and the power device relative to the load; and a control mechanism coupled to the first sensor, the tilting mechanism and the second sensor for actuating the tilting mechanism in response to output from the first sensor and the second sensor.

Other objects, advantages and salient features of the invention will become apparent from the following detailed description, which, taken in conjunction with the annexed drawings, discloses three preferred embodiments of the invention.

BRIEF DESCRIPTION OF THE DRAWINGS

Referring now to the drawings, which form part of this original disclosure:

FIG. 1 is a side elevational view of a load landing apparatus in accordance with the present invention;

FIG. 8 is a partial, side elevational view of a third embodiment of the load landing apparatus in accordance with the present invention having a necklace probe coupled to the load.

DETAILED DESCRIPTION OF THE INVENTION

Figure 2:
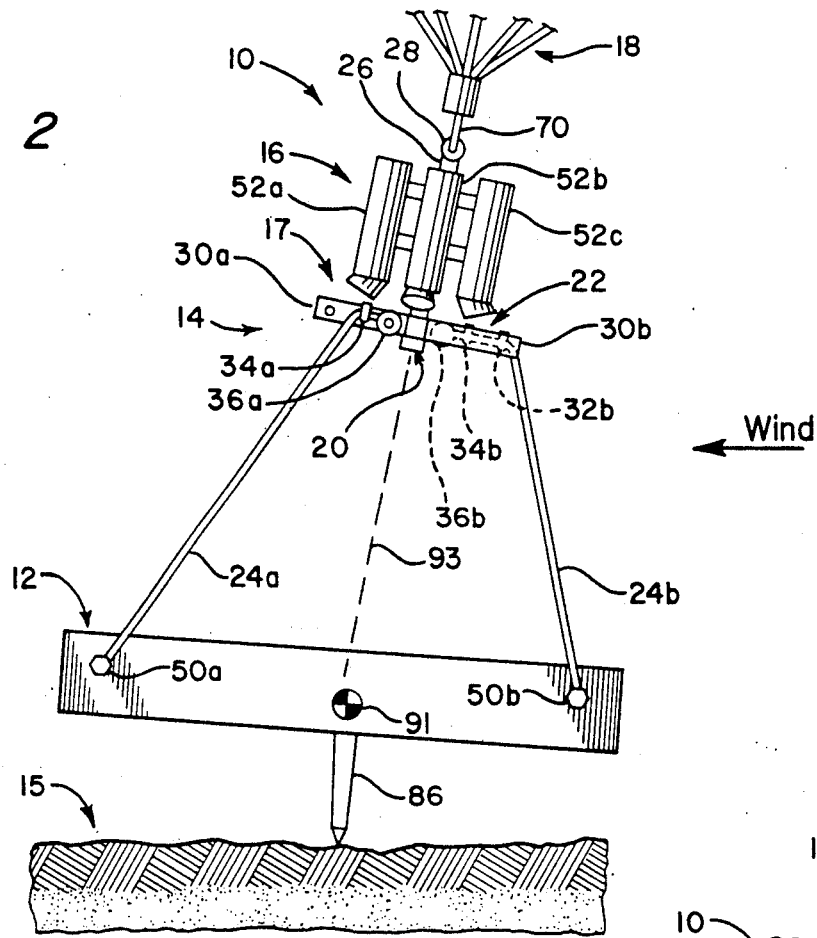
FIG. 2 is a partial, side elevational view of the load landing apparatus of FIG. 1 with the support assembly and rocket assembly tilted to counteract a five knot wind.

Initially referring to FIG. 1, the load landing apparatus 10 according to the present invention is illustrated, and includes a support assembly 14 having a tilting mechanism 17 and bridle lines 24a-24d for pivotally coupling the load 12 thereto, a power or rocket assembly 16 rigidly coupled to the support assembly 14, a parachute assembly 18 coupled to the support assembly 14 and a control assembly 20.

The operation of the apparatus 10 in general terms is as follows. A low flying aircraft flies over the target area and ejects the apparatus 10 and its load or vehicle 12 from the aircraft at an altitude below 500 feet in a conventional manner. Shortly after load 12 is ejected, parachute assembly 18 opens and begins decelerating the descent of load 12 in a conventional manner. After a predetermined period of time, as determined by control assembly 20, rocket assembly 16 is ignited for a predetermined period of time as determined by control assembly 20 to further decelerate the descent of load 12 to near zero. Then, after an additional period of time, support assembly 14 and rocket assembly 16 are tilted via tilting mechanism 17 relative to the load 12 to change the horizontal and vertical thrust components of rocket assembly 14 to counteract the horizontal velocity of load 12 due to wind drift. As described in more detail below, tilting mechanism 17 acts on the plurality of bridle lines suspending the load 12 from the support assembly 14 and comprises means for increasing the effective lengths of selective bridle lines.

Figure 3:
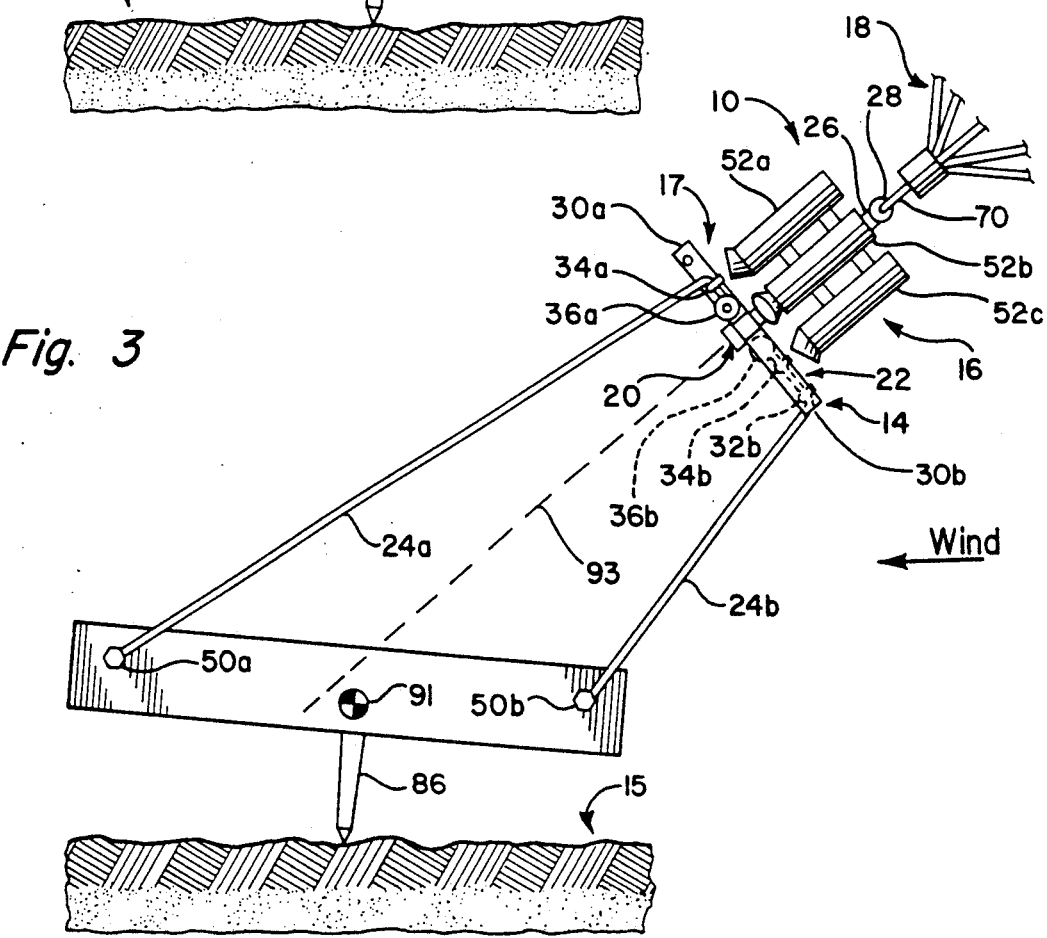
FIG. 3 is a partial, side elevational view of the load landing apparatus of FIG. 1 with the support assembly and rocket assembly tilted to counteract a 10-15 knot wind.

Load 12 may be cargo or a tank carrying personnel therein. Therefore, it is preferable that load 12 land upright with minimal impact velocity. Accordingly, load 12 should impact the ground 15 at a vertical velocity equivalent to being dropped one foot above the ground or less. To prevent load 12 from tipping over upon impact, the horizontal velocity of load 12 should be near zero, or load 12 should impact with its heel or upwind end first with the residual horizontal drift velocity pivoting the toe or downwind end of load 12 to the ground. Preferably, load 12 will impact ground 15 with its toe end angled up about five degrees above the ground 15, as seen in FIGS. 2 and 3.

Figure 4:
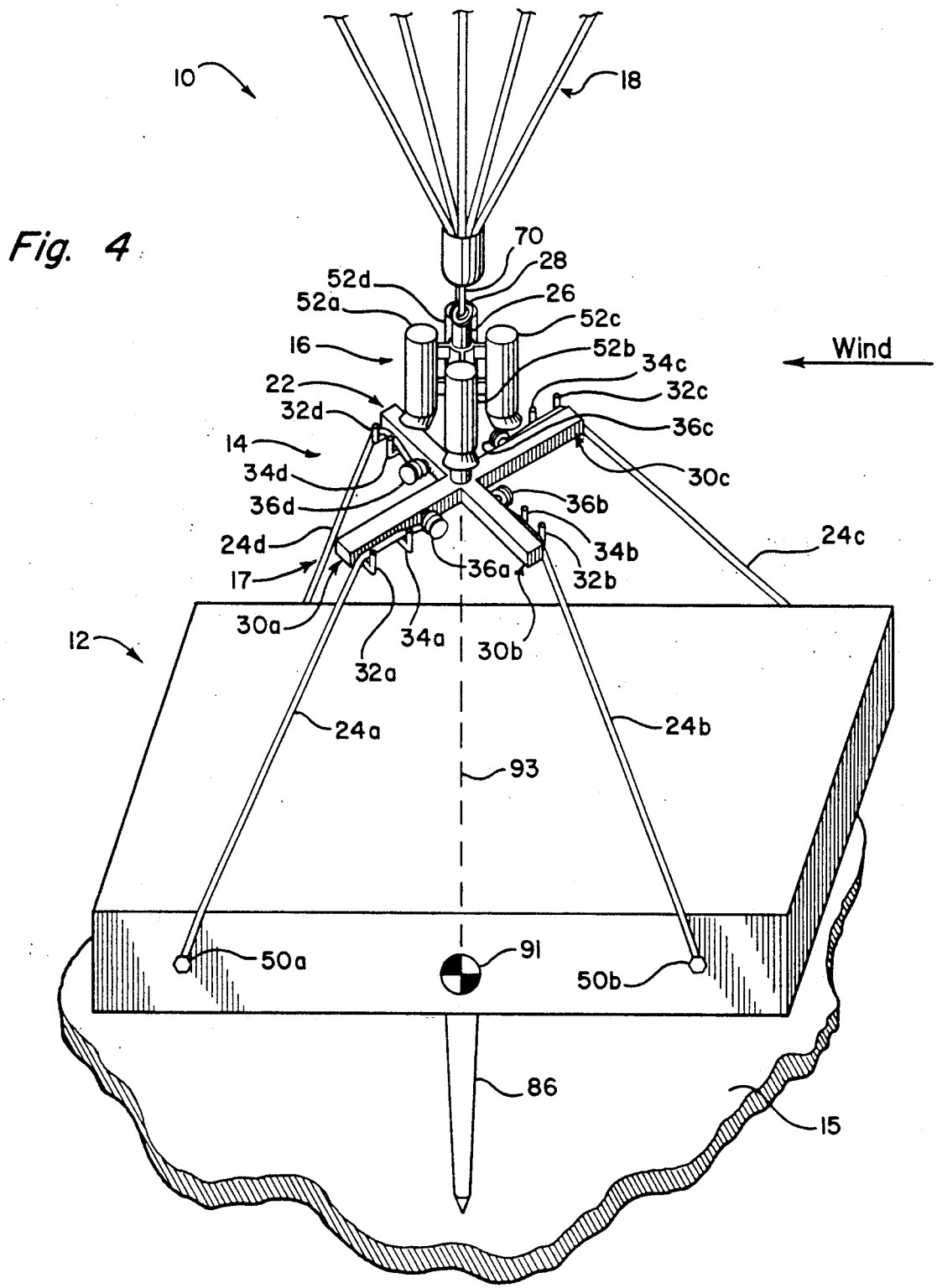
FIG. 4 is a partial, perspective view of the load landing apparatus of FIG. 1.

Referring now to FIG. 4, support assembly 14 includes a rigid support member 22 with four flexible supports or bridle lines 24a, 24b, 24c and 24d extending outwardly and downwardly therefrom and releasably coupled to load 12. Support member 22 has generally an inverted T-shape when viewed in elevation and includes an elongated upstanding post member 26 with a connecting ring 28 coupled to one end and four arm members 30a, 30b, 30c and 30d extending perpendicularly from the second end of post member 26. Arm members 30a, 30b, 30c and 30d are spaced about 90° apart and extend radially outwardly from post member 26 to define four quadrants between adjacent arm members 30a, 30b, 30c and 30d. Post member 26 is advantageously normally substantially perpendicular to the horizontal plane containing the load when the bridle lines are taut and is normally aligned with the center of gravity 91 of the load as indicated by dotted line 93 seen in FIGS. 1-4.

Since arm members 30a, 30b, 30c and 30d are all substantially identical to each other, only arm member 30a will be described in detail herein. The part of remaining arm members have numbering similar to arm member 30a, except for having a letter b, c or d to distinguish the different arms.

Arm member 30a includes inner and outer L-shaped coupling members or support bolts 32a and 34a, respectively, rigidly coupled thereto for supporting bridle line 24a thereon, and a reel 36a which is rotatably coupled to arm member 30a by a shaft 38a. A brake mechanism 40a is coupled to arm member 30a and around shaft 38a for controlling the rotation of the reel 36a and amount of bridle line to be released therefrom.

Bridle line 24a has one end fixedly coupled to reel 36a and a second end releasably coupled to the load by an exploding bolt 50a as seen in FIGS. 1-4. The bridle line 24a is wrapped around reel 36a for a predetermined number of turns and then extends over inner support bolt 34a, over outer support bolt 32a and down to the load 12 where it is connected by the exploding bolt 50a. Exploding bolt 50a is mounted to load 12 in a conventional manner similar to exploding bolt 32a.

The four bridle lines 24a, 24b, 24c and 24d extend from the free ends of the arm members 30a, 30b, 30c, and 30d to the corners of the load 12 to form two non-parallel sides of a trapezoid when viewed in both the side and end elevational views. The bridle lines are advantageously of equal length.

Figure 5:
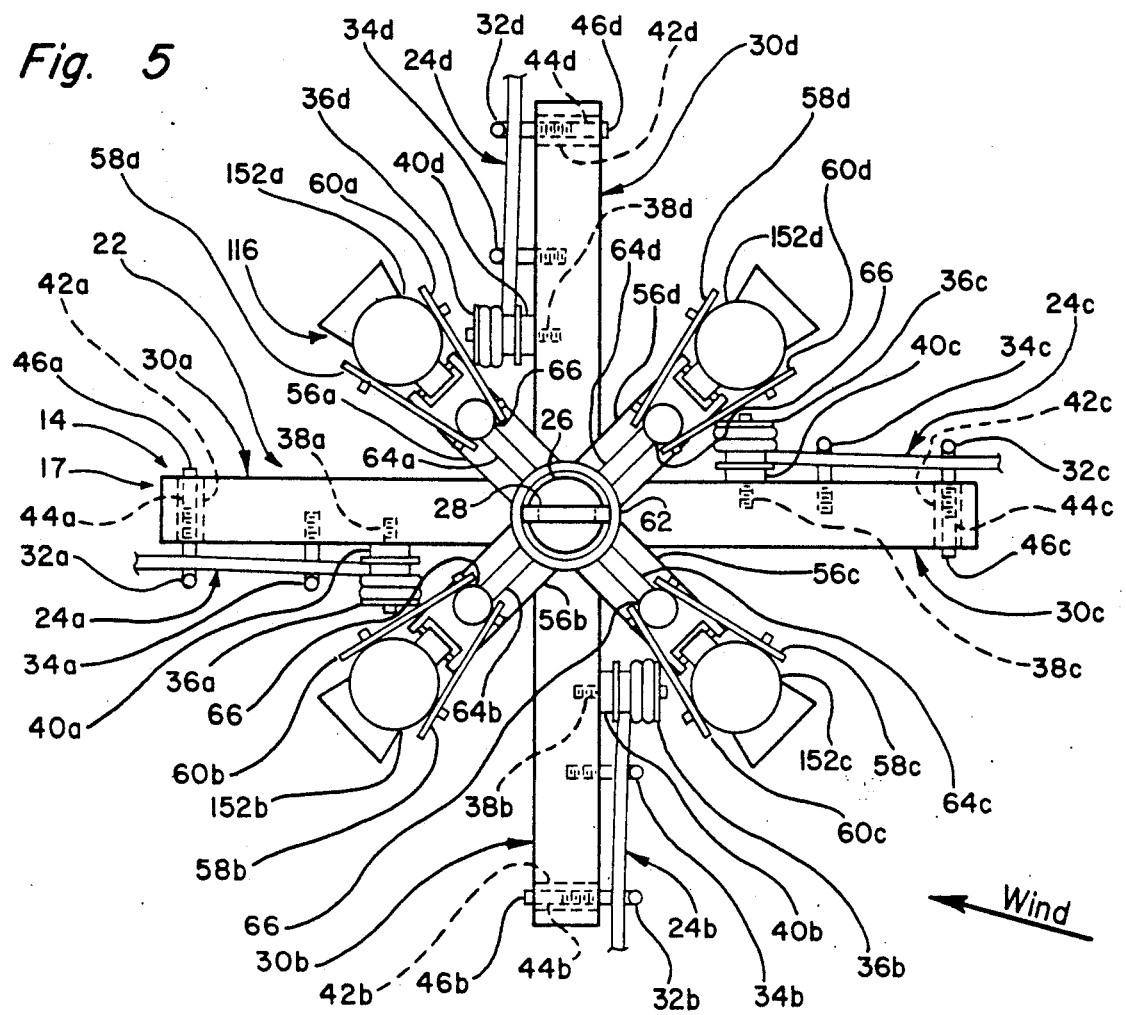
FIG. 5 is a partial, top plan view of a second embodiment of the load landing apparatus having a support assembly with an adjustable rocket assembly coupled thereto.

Outer support bolt 32a, as seen in FIG. 5, is an exploding bolt and includes a cylindrical container 42a rigidly coupled to and extending through arm member 30a for threadedly receiving outer support bolt 32a and containing a powder charge 44a. A primer cap 46a is rigidly coupled to container 42a and electrically coupled to the control assembly 20 in a conventional manner. If additional length of bridle line 24a needs to be released to counteract wind drift, then control assembly 20 sends an electrical charge to ignite primer cap 46a which in turn ignites the powder charge 44a causing the threads of outer support bolt 32a to shear from container 42a, releasing outer support bolt 32a from arm member 30a. Once bridle line 24a is released from bolt 32a, it becomes slack and this slack is taken up by pivotal movement of the support assembly 14 under the influence of the rocket assembly 16 relative to the load, thereby changing the orientation of the support assembly relative to the load.

As is evident from FIGS. 1-4, tilting mechanism 17 comprises arm members 30a-30d, inner and outer bolts 32a-32d and 34a-34c, reels 36a-36d, and brakes 40a-40d, used in conjunction with bridle lines 24a-24d.

Rocket assembly 16 includes four rockets 52a, 52b, 52c and 52d rigidly coupled to upstanding post member 26 and having their exhausts angled at about 45° to the post member to produce thrust in both the horizontal and vertical directions. Rockets 52a-52d are spaced 90° apart about post member 26 so that the horizontal thrust components of each rocket normally will cancel each other when post member 26 is vertically oriented. Rockets 52a-52d may be of the conventional, solid propellant type equipped with electrical or pyrotechnic igniting devices (not shown) in a conventional manner.

Figure 6:
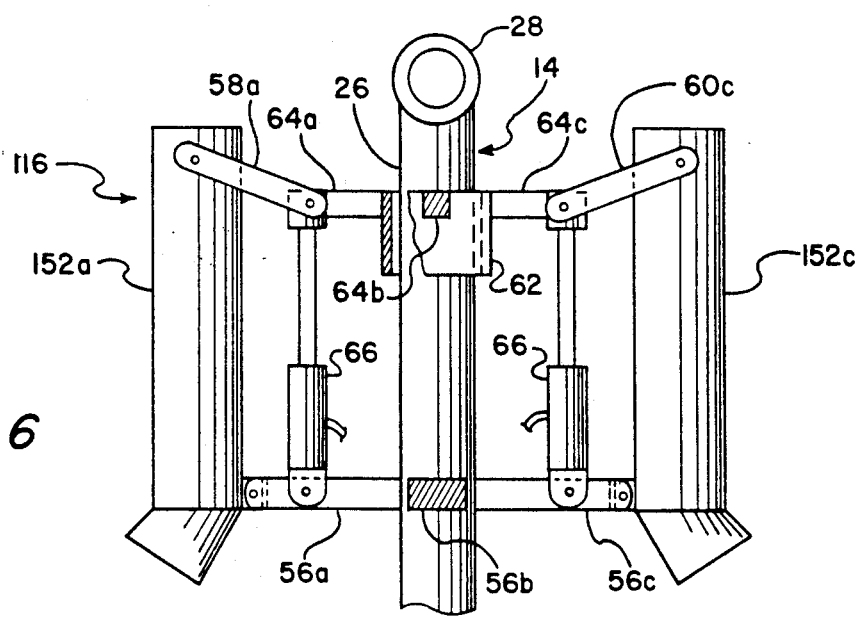
FIG. 6 is a partial, side elevational view of the support assembly and rocket assembly of FIG. 5.

Referring to FIGS. 5 and 6, a second embodiment of the present invention is shown having an adjustable rocket assembly 116 which is rigidly coupled to post member 26. Rocket assembly 116 includes four rockets 152a, 152b, 152c and 152d each pivotably coupled at their lower end to a lower bracket 56a-56d, respectively, which are rigidly coupled to the post member 26. At their upper ends, rockets 152a, 152b, 152c and 152d are pivotably coupled to a pair of links 58a-58d and 60a-60d. Links 58a-58d and 60a-60d are in turn slidably coupled to post member 26 by a ring 62 having four radially extending upper brackets 64a-64d spaced 90° apart. A piston 66 is extendibly coupled between each lower bracket 56a-56c and corresponding upper bracket 64a-64c for slidably moving ring 62 axially along post member 26 and for tilting rockets 152 to vary the amount of the vertical and horizontal thrust components of each rocket in response to an output signal from central control unit 74.

As seen in FIG. 1, parachute assembly 18 includes a parachute 68 having a connecting member 70, such as a hook, for attaching the parachute assembly 18 to connecting ring 28 of support member 22. Parachute assembly 18 not only decelerates load 12 prior to ignition of rockets 52a-52d or 152a-152d, but also allows the wind to carry support assembly 14 away from the load 12 upon bridle lines 24a-24d being released from the load 12. While only one parachute is illustrated, it will be apparent to those skilled in the art that several smaller parachutes may be used.

Figure 7:
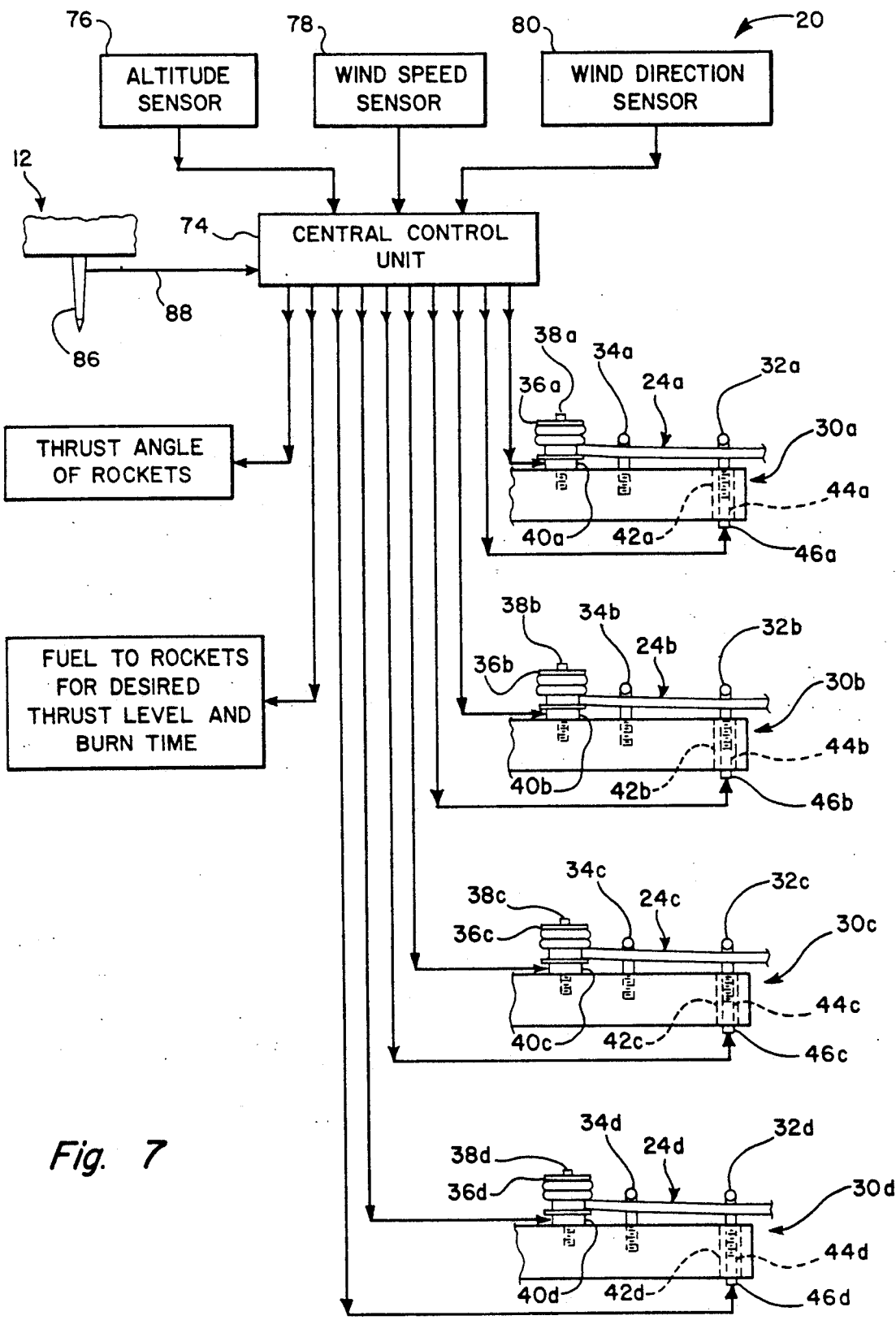
FIG. 7 is a schematic diagram of the control and tilting mechanisms for the load landing apparatus of FIGS. 1-6.

Referring now to FIG. 7, control assembly 20 is illustrated and includes any suitable central control unit 74 known in the art, such as a microprocessor, which is coupled to an altitude sensor 76, a wind speed sensor 78 and a wind direction sensor 80. Control assembly 20 is advantageously coupled to the bottom of support assembly 14 as seen in FIGS. 1-3. Central control unit 74 receives output signals from altitude sensor 76, wind speed sensor 78 and wind direction sensor 80 for controlling the thrust angle of the rockets 152a-152d, controlling the amount of fuel to the rockets for the desired thrust level and burn time, determining which of the outer bolts 32a-32d are to be exploded, determining the amount of bridle line slack to be released from reels 36a-36d, and exploding the bolts 50a-50d for releasing the support assembly 14, rocket assembly 16 and parachute assembly 18 away from load 12.

Central control units, such as central control unit 74, are well known in the art, and thus, unit 74 is not described in detail herein. A central control unit such as the one disclosed in U.S. Pat. No. 4,409,658 to Beusse can be used and is hereby incorporated herein by reference.

As seen in FIGS. 1-4 and 7, a touchdown sensor 86 is coupled to the bottom of the load 12 and can be any conventional sensor capable of detecting contact with the ground and transmitting an electrical signal indicating ground contact to the central control unit 74 via electrical line 88. Line 88 is suitably coupled to apparatus 10 to interconnect sensor 86 and unit 74.

OPERATION

In operation, load landing apparatus 10 is ejected or dropped from an aircraft at a low altitude with parachute 68 opening almost immediately after ejection. Parachute 68 should decelerate load 12 to a vertical descent velocity of about 70 feet per second. During descent, central control unit 74 will constantly monitor the altitude of load 12, wind speed, wind direction and rate of descent. In the first and second embodiments of FIGS. 1-7, touchdown sensor 86 will contact the ground 15 with load 12 having a zero vertical velocity, and being about three feet above ground 15.

Touchdown sensor 86 will then send a signal to central control unit 74 via line 88 to reduce the thrust of rockets 52a-52d or 152a-152d and release the appropriate brakes 40a-40d and explode the appropriate outer support bolts 32a-32d based on wind direction, thereby increasing the effective length of the appropriate bridle lines 24a-24d by allowing them to become momentarily slack. As this occurs as seen in FIG. 2, support member 22 and rocket assembly 16 or 116 will shift upwind and tilt relative to load 12 and pivot about a horizontal axis offset from the center of gravity 91 of load 12 due to the thrust of the rockets. During this shifting and tilting period, load 12 will be essentially still because of its much greater mass. This shifting or sidewards movement of support member 22 ends when the released and slack bridle lines become taut. As a result of this shifting, the angle of the support member 22 and rocket assembly 16 or 116 relative to the load changes, thereby changing the direction of the horizontal and vertical thrust components of rockets 52a-52d or 152a-152d. As seen in FIG. 2, the horizontal thrust component of the rockets increases in the downwind direction, thereby counteracting and tending to cancel the horizontal velocity of the load resulting from the wind.

When reducing the thrust of rockets 52a-52d or 152a-152d, the upward vertical thrust component of the rockets after shifting and tilting should be about 1G (i.e., 32.2 ft/sec$^2$) or slightly less than 1G to provide a soft landing.

During landing and in view of the directional and speed information detected by sensors 78 and 80, these sensors 78 and 80 send signals to central control unit 74 for exploding out two adjacent outer support bolts 32a-32d in the identified 90° quadrant of the wind direction to increase the effective length of the appropriate bridle lines. From the magnitude information, central control unit 74 releases the brakes 40a-40d of the corresponding reels 36a-36d to increase the length of the appropriate bridle lines for a predetermined distance if the wind drift is above five knots and below 10 knots and releases an additional amount of length if the wind drift is above 10 knots as seen in FIG. 3. No additional slack is released if wind drift is below five knots as seen in FIG. 2.

Generally, it will be necessary that load 12 be nearly stopped vertically when using touchdown sensor 86, if drift cancellation is to be generated by reducing the thrust of the rockets 52a-52d or 152a-152d or by using sustainer rockets (not shown) with a lower thrust after rockets 52a-152d or 152a-152d burn out.

However, the present invention using the same load landing apparatus 10, shown in FIGS. 1-7, can be used with higher thrust rockets in lieu of reducing the thrust of the rockets 52a-52d or 152a-152d or using sustainer rockets with the rockets 52a-52d or 152a-152d.

The advantages of using rockets 52a-52d or 152a-152d with a high thrust level for wind drift cancellation are as follows: (1) there is no need to reduce rocket thrust or provide additional sustainer rockets; (2) the amount of bridle line slack required for a given wind drift cancellation is greatly reduced; and (3) there is quicker reorientation of the support assembly 14 relative to the load 12.

The major disadvantage of using rockets with a high thrust level for wind drift cancellation is that the support assembly 12 must be shifted and tilted at about 26-30 feet above the ground 15. This would require central control unit 74 to constantly monitor wind drift direction and magnitudes as well as the vertical descent velocity of the load 12 throughout its final 26-30 foot drop. Accordingly, this method is a little more complicated since both the horizontal velocity and vertical velocity of load 10 are being cancelled simultaneously.

When using rockets 52a-52d or 152a-152d with a high thrust level, touchdown sensor 86 should be replaced with radar and/or other conventional sensors which can measure the load's altitude, wind speed and wind direction. Preferably, a necklace probe 90 is used as seen in FIG. 8.

Referring now to FIG. 8, a third embodiment is illustrated using a necklace probe 90 attached to load 12 instead of a touchdown probe 86. Necklace probe 90 comprises two parallel wires 92a and 92b interconnected by sensor beads 94 spaced about four inches apart along the length of wires 92a and 92b. The distance between the wires 92a and 92b should be such that the wires are prevented from twisting and they keep their angular relation relative to load 12. An aerodynamic stabilizing fin (not shown) may be used to further maintain the angular relationship of necklace probe 90 relative to load 12. The lowermost sensor bead 94 contains X, Y and Z accelerometers for indicating the wind direction and speed when the lowermost sensor bead 94 strikes the ground. The accelerometers in the lowermost sensor bead 94 should be accurate enough to specify the wind direction and whether the wind speed is below five knots, between five and 10 knots, or over 10 knots.

The directional information from the lowermost sensor bead 94 is sent via an electrical signal to central control unit 74 for exploding out two adjacent outer support bolts 32a-32a in the identified 90° quadrant of the wind direction. From the magnitude information, central control unit 74 releases the brakes 40a-40d of the corresponding reels 36a-36d for a predetermined distance if the drift is above five knots and below 10 knots and releases an additional amount of length if the wind drift is above 10 knots. No additional slack is released if wind drift is below five knots. The remaining beads 94 house piezoelectric generators for supplying to the central control unit a signal indicating the rate of descent and altitude of the load.

All of the following impacting beads continue supplying their signals. As the load slows down, so do the signals. If their times do not match the preprogrammed times, the central control unit 74 adjusts a valve to meter the amount of fuel to the rockets for correcting the thrust level.

When the load comes to a float at a preset distance above ground 15, then a signal from central control unit 74 sets the thrust level of the rockets at a level below the force of gravity. The bridle lines 24 are then disconnected and carried away from load 12. Thus the load or the vehicle is combat ready with zero delay.

While only three embodiments have been chosen to illustrate the invention, it will be understood by those skilled in the art that various changes and modifications can be made herein without departing from the scope of the invention a defined in the appended claims.

What is claimed is:

1. A load landing apparatus for decelerating the descent of a load and counteracting wind drift, the combination comprising:
   power means for generating a thrust;
   support means coupled to said power means and to the load, and including
   a rigid support member,
   means for rigidly coupling said power means to said support means, and
   tilting means for adjustably coupling said support member to the load for pivotal movement about a horizontal axis offset from the center of gravity of the load;
   first sensing means, coupled to said support means, for determining the direction and speed of the wind relative to the load;
   second sensing means, coupled to said support means, for determining the altitude of the load; an
   control means, coupled to said first and second sensing means and to said tilting means, for actuating said tilting means in response to output from said first and second sensing means.

2. A load landing apparatus according to claim 1, further comprising
   a parachute assembly coupled to said support member.

3. A load landing apparatus according to claim 1, wherein
   said support member has a generally inverted T-shape in elevation.

4. A load landing apparatus according to claim 1, wherein
   said tilting means includes a plurality of adjustable bridle members suspending said load from said support member, and means for selectively adjusting the length of each of said bridle members extending between said load and said support member.

5. A load landing apparatus according to claim 4, wherein
   said bridle members are flexible lines.

6. A load landing apparatus according to claim 4, wherein
   said bridle members include four equally spaced flexible lines.

7. A load landing apparatus according to claim 4, wherein
each of said bridle members are releasably coupled to said load by exploding bolts.

8. A load landing apparatus according to claim 4, wherein
said control means includes means for selectively actuating two adjacent bridle members substantially simultaneously for tilting said support member and said power means relative to the load.

9. A load landing apparatus according to claim 4, wherein
said means for selectively adjusting comprising means for increasing the length of each of said bridle members a predetermined amount depending upon wind speed.

10. A load landing apparatus according to claim 9, wherein
said bridle members are flexible bridle lines, and
said means for increasing the length of each of said bridle members includes means for releasing additional bridle line to selectively increase the length of each of said bridle lines individually.

11. A load landing apparatus according to claim 10, wherein
said means for releasing includes a plurality of coupling members for coupling each of said bridle lines at least two spaced locations along said support member with at least one of said coupling members on each of said bridle lines being releasably coupled to said support member for selectively releasing said additional bridle line of each of said bridle lines individually.

12. A load landing apparatus according to claim 4, wherein said means for selectively adjusting comprises exploding bolts adjustably coupling said bridle members to said support means.

13. A load landing apparatus for decelerating the descent of a load and counteracting wind drift, the combination comprising: a support having first and second ends;
power means, rigidly coupled to said support, for decelerating the descent of the load and counteracting wind drift;
first sensor means, coupled to said support, for determining wind speed and wind direction relative to the load;
second sensor means, coupled to said support, for determining the altitude of the load;
means, coupled to said second end of said support and to the load, for suspending the load from said support during descent of the load;
said bridle means including,
a plurality of bridle members, each of said bridle members having a first predetermined length extending between said support and the load, and
tilting means for adjusting said first predetermined length of at least one of said bridle members to a second predetermined length, and thereby tilting said support and said power means relative to the load; and
control means, coupled to said first sensor means, said tilting means and said second sensor means for actuating said tilting means in response to output from said first sensor means and said second sensor means.

14. A load landing apparatus according to claim 13, further comprising
a parachute assembly coupled to said support member.

15. A load landing apparatus according to claim 13, wherein
said support member has a generally inverted T-shape in elevation.

16. A load landing apparatus according to claim 13, wherein
said tilting means includes means for selectively adjusting the length of each of said bridle members extending between said load and said support member.

17. A load landing apparatus according to claim 16, wherein
said bridle members are flexible lines.

18. A load landing apparatus according to claim 16, wherein
said bridle members include four equally spaced flexible lines.

19. A load landing apparatus according to claim 16, wherein
each of said bridle members are releasably coupled to said load by exploding bolts.

20. A load landing apparatus according to claim 16, wherein
said control means includes means for selectively actuating two adjacent bridle members substantially simultaneously for tilting said support member and said power means relative to the load.

21. A load landing apparatus according to claim 16, wherein
said means for selectively adjusting comprising means for increasing the length of each of said bridle members a predetermined amount depending upon wind speed.

22. A load landing apparatus according to claim 21, wherein
said bridle members are flexible bridle lines, and
said means for increasing the length of each of said bridle members includes means for releasing additional bridle line to selectively increase the length of each of said bridle lines individually.

23. A load landing apparatus according to claim 22, wherein
said means for releasing includes a plurality of coupling members for coupling each of said bridle lines at least two spaced locations along said support member with at least one of said coupling members on each of said bridle lines being releasably coupled to said support member for selectively releasing said additional bridle line of each of said bridle lines individually.

24. A load landing apparatus according to claim 16 wherein
said means for selectively adjusting comprises exploding bolts adjustably coupling said bridle members to said support.

* * * * *